Dec. 5, 1967  F. W. ROHE  3,355,850
INSERT WITH ENDS RIVETED TO PANEL SKINS
Filed Feb. 14, 1964
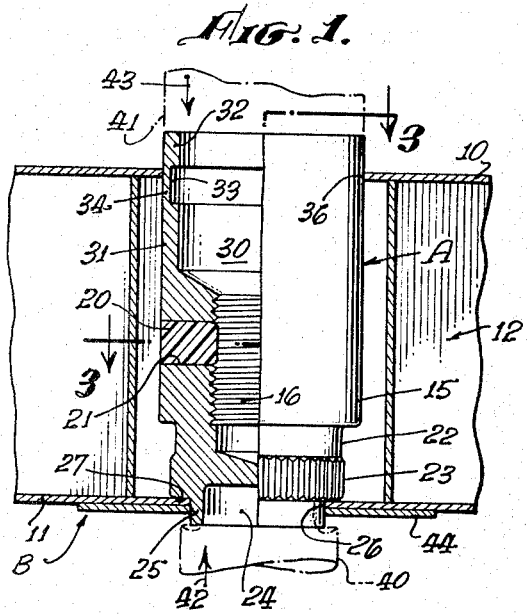
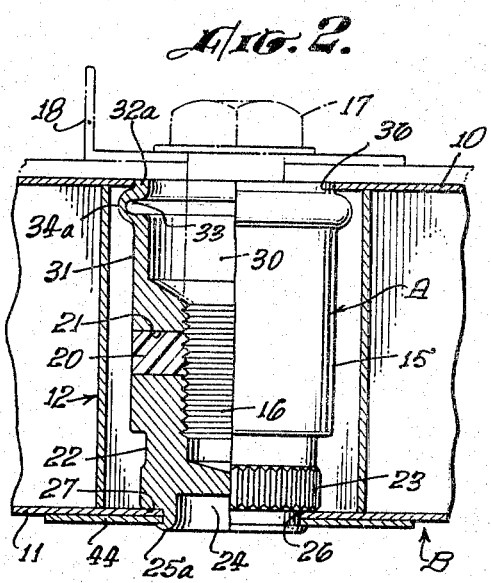
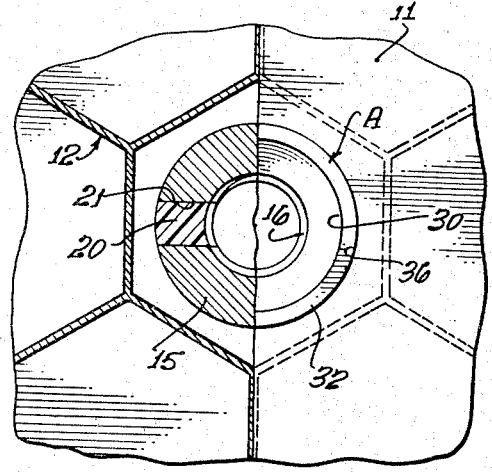
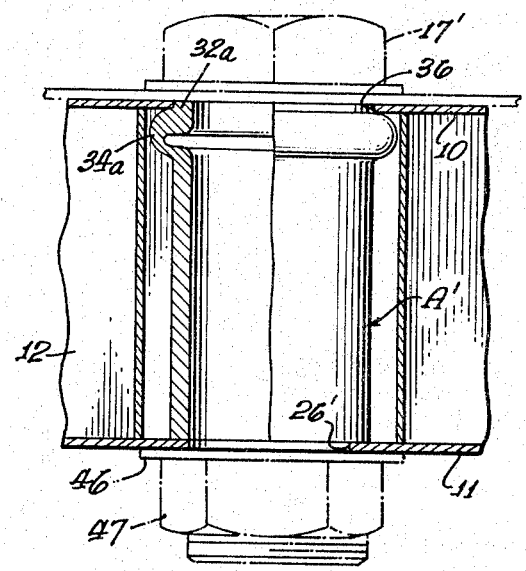
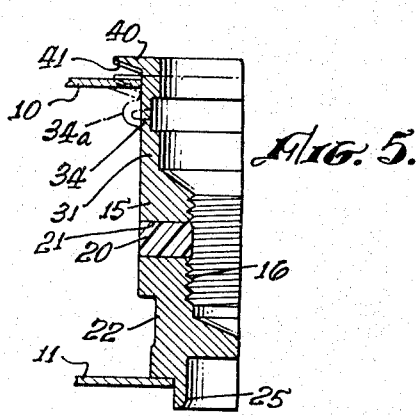
FREDERICK W. ROHE,
INVENTOR.
BY Lynn W Latta
ATTORNEY.

United States Patent Office 3,355,850
Patented Dec. 5, 1967

3,355,850
INSERT WITH ENDS RIVETED TO PANEL SKINS
Frederick W. Rohe, 5191 S. Bradford, Placentia, Calif. 92670
Filed Feb. 14, 1964, Ser. No. 344,906
3 Claims. (Cl. 52—617)

This invention relates to fasteners of the type commonly referred to as "spacers," for installation in lightweight sandwich panels embodying spaced parallel skin sheets secured to opposite sides of a low-density core structure, usually of honeycomb type. The general object of the invention is to provide a fastener of the spacer type having improved means for mechanical anchorage of its respective ends to the respective skin sheets of the sandwich panel structure, such that a potting compound or molding resin can be optionally utilized for anchorage of the spacer in the sandwich panel, or can be dispensed with.

A principal object of the invention is to provide a spacer adapted to have its respective ends secured to the respective skin sheets of a sandwich panel in consecutive stages of a continuous setting operation in which the spacer is subjected to axial compression. The invention is especially directed to the development of an anchoring connection especially adapted to resist the axial pull of a bolt threaded into the spacer for securing the sandwich panel to a frame member or the like, and to resist the tendency to strip the spacer out of the panel.

A further object is to provide a one-piece integral spacer of generally tubular form having a cross-sectional configuration such as to develop two stages of deformation of the spacer when subjected to axial compression, with first one end and then the other end of the spacer being mechanically secured to the sandwich panel.

Other objects and advantages will become apparent in the ensuing specification and appended drawing in which:

FIG. 1 is a cross-sectional view of a fragmentary portion of a sandwich panel with my improved one-piece spacer inserted therein preparatory to being subjected to compression;

FIG. 2 is a cross-sectional view of a sandwich panel fragment and the spacer installed therein and mechanically anchored to the respective skin sheets, a frame member and connecting bolt being shown in phantom;

FIG. 3 is a sectional view taken on the line 3—3 of FIG. 1;

FIG. 4 is a cross-sectional view of a fragment of sandwich panel and a spacer embodying a modified form of the invention, suitable for use with a through bolt; and FIG. 5 is a fragmentary axial sectional view of a panel assembly embodying another modified form of the spacer.

Referring now to the drawings in detail, and in particular to FIGS. 1–3, I have shown therein, as an example of one form in which the invention may be embodied, a one-piece spacer, designated generally at A, installed in a sandwich panel B comprising respective skin sheets 10 and 11 and a honeycomb core structure 12 to which the skin sheets 10 and 11 are secured.

My improved spacer A comprises a relatively thick-walled central body 15 provided with a threaded bore 16 to receive a bolt 17 (FIG. 2) by means of which the sandwich structure B can be secured to a frame member 18 or other body. The central body portion 15 of the spacer is provided with suitable thread-lock means which may be in the form of a nylon plug 20 or equivalent, press fitted in a radial bore 21 in the wall of body 15 and adapted to make compression engagement with the threaded end of the bolt 17.

Spacer A has a reduced end portion 22 which may be provided with external knurling 23 for rotation-resisting anchorage in a body of potting compound or cement filling the spacer cavity in the sandwich panel B where such potting compound is employed. The reduced end portion 22 has a tip which is further reduced in diameter and counterbored at 24 to provide a relatively thin-walled tubular tip 25. The skin sheet 11 is provided with a circular aperture 26 of the proper diameter to snugly receive the neck 25. An annular radial shoulder 27 is formed at the base of the tip 25 where the end portion 22 is further reduced in diameter, and is adapted to seat flatly against the inner face of the skin sheet 26.

The opposite end of the spacer, which is originally of the same diameter as central body portion 15, is counterbored at 30 to provide a tubular portion 31 having a wall thickness somewhat greater than that of the tip 25. The tubular portion 31 is continued at 32 at the end of the spacer, on the other side of an internal shallow annular groove 33 which further reduces the wall thickness of the spacer to provide a thin, collapsible cylinder web 34.

The method of developing the panel-fastener structure of FIG. 2 involves, as a first step, perforating the skin sheets 10 and 11 of the sandwich panel B to provide therein the relatively small aperture 26 to receive the tubular tip 25, and a relatively large aperture 36 in skin sheet 10, to receive the full-diameter tubular end portion 31–34 of the spacer. As another step, selection is made of a spacer A having a length so related to the depth of panel B that the collapsible section 34 of this end portion of the spacer is disposed closely adjacent but largely inwardly of the plane of the skin sheet 10. The axial length of the outer end portion 32 of the spacer is such that when compressed in the fully set position of the spacer shown in FIG. 2, the outer end will be substantially flush with the outer face of skin sheet 10 as shown in FIG. 2.

As a further step of the method, the ratio between the dimensions of the lip 25 and the larger tubular end portion 31–34 of the rivet is selected so as to maintain the larger end portion 31–34 substantially undeformed until the lip 25a has been turned and clamped upon the skin sheet 11. Also, the collapsible portion 34 is disposed at the outer diameter of the end portion 31–34 of the spacer and is offset outwardly with respect to the full thickness of the end portions 31, 32 so that outward collapse of the wall section 34 is assured.

The spacer A is inserted through the large aperture 36 and its tubular tip 25 is fitted into the smaller skin sheet opening 26, the annular shoulder 27 coming to rest against the inner face of skin sheet 11. The swaging tool, shown in phantom at 40, having a pilot portion adapted to be snugly fitted within the counterbore 24 and a shoulder portion of the proper form to turn the tubular lip 25 outwardly and back against the outer face of skin sheet 11 at 25a (FIG. 2) is then fitted to the tubular lip 25 with its pilot portion received in recess 24. The skin sheet 11 may be reinforced by a suitable washer or the like 44 interposed between the turned lip 25a and the outer face of skin sheet 11. An upsetting tool 41, likewise shown in phantom, is then applied to the larger end 32 of the spacer. Pressure is then applied to the respective ends of the spacer by the tools 40 and 41 as indicated by the arrows 42 and 43. Initially, the pressure is sufficient to turn the lip 25 outwardly and back against the skin sheet 11 so as to clamp the latter at the edge of aperture 26 tightly between the turned lip 25a and the shoulder 27. The pressure is then increased, and in a subsequent stage of operation the weakened section 34 of the larger end of the spacer is collapsed outwardly to form a bulbed semi-toroidal shoulder 34a engaged against the inner side of skin sheet 10 at the inner edge of aperture 36. Under the compression, the tubular wall portions 31 and 32 as well as the weakened section 34 will be shortened axially and expanded radially, the end portion 32 becoming a radially thickened head 32a expanded into tight compressive engagement with the inner margin of aperture 36.

The counterbore 30 provides an opening in the larger end of the spacer, through which a bolt 17 may be inserted and threaded into the internally threaded body section 15 of the spacer. The spacer is firmly anchored in the sandwich panel B in a manner to resist being stripped axially out of the panel by the pull of the bolt 17 as it is tightened, resistance to stripping being provided for by the abutting engagement of toroidal head 34a against the inner face of skin sheet 10, and the clamped engagement of turned lip 25a against the outer face of skin sheet 11.

FIG. 4 discloses a modified form of the spacer, adapted to function purely as a spacer for a through bolt 17. Initially, this spacer is in the form of a plain cylinder with uniform external and internal diameters with the exception of a weakened section corresponding to the weakened section 34 of FIG. 1. The length of the spacer A' is such that the weakened wall section will be disposed in substantially the same relation to the skin sheet 10 as disclosed in FIG. 1, while the opposite end of the spacer will abut against the inner surface of the skin sheet 11. In this assembly, the aperture 26' in skin sheet 11 is of the same diameter as the internal diameter of the spacer A'. Setting of the spacer A' may be effected simply by inserting it through the spacer and through the aperture 26', then applying a washer 46 over the threaded end of the bolt and against the skin sheet 11, and then threading a nut 47 onto the bolt and against the washer, and screwing the nut 47 onto the bolt to draw the bolt head against the collapsible end of the spacer until the bulbed annular shoulder 34a has been formed and the head 32a positioned flush with the skin sheet 10.

As shown in FIG. 5, the spacer may have a preformed counter-sink type head 40 having radial flutes 41 in a frusto-conical undershoulder thereof. Flutes 41 are adapted to be embedded in the skin sheet 10 with a rotation-resisting grip thereon. Head 40 becomes dimpled into the skin sheet 10 as the neck 34 is bulbed to provide the head 34a.

I claim:
1. A one piece spacer for mechanical anchorage to a sandwich panel having first and second parallel skin sheets spaced by a core, at least the first skin sheet and the core having an aperture extending therethrough, said spacer comprising: a generally cylindrical member having an external shoulder formed thereon for abutting the interior surface of the second skin sheet, said member terminating at one end in a head portion and terminating at the opposite end in a reduced diameter lip portion adapted to extend through an aperture in the second skin sheet and be turned back to abut the exterior of the second skin sheet, a first axial bore extending into said member from said one end, internal threads formed in the bore wall near the internal end of the bore, the diameter of said bore varying along its length so as to define a body portion axially spaced from said head portion, and a relatively thin collapsible wall portion intermediate the head and body portions, said collapsible portion being adapted to bulb outwardly under axially compression to form an annular shoulder for engaging the inner surface of said first skin sheet, a second axial bore extending into said member from said opposite end, and a sealing partition separating said first and second bores.

2. A one piece spacer for mechanical anchorage to a sandwich panel in accordance with claim 1 wherein: the wall of said lip portion is weaker than the wall of said thin wall portion so that axial compression applied to said member preferentially turns said lip portion outward to engage the outer surface of said second skin sheet and increased compression collapses said thin wall portion outwardly to engage the inner surface of said first skin sheet.

3. In combination with a sandwich panel structure comprising spaced parallel skin sheets and a low-density core having respective sides secured to said skin sheets, said skin sheets having respective axially aligned apertures of relatively large and small diameters respectively, and said core having a cavity at least as large in diameter as said relatively large aperture and extending therefrom to said relatively small aperture; a one piece spacer comprising at one end a tubular wall portion terminating in a head of substantially the same diameter as said larger aperture, said head being disposed flush with one skin and tightly received in said relatively large aperture and having at its other end an annular face supported against the inner face of the other skin sheet by abutting engagement therewith, said tubular wall portion including a collapsed weakened section thereof bulbed radially outwardly immediately adjacent said head and providing an annular shoulder abutted against the inner face of the skin sheet defining said relatively large aperture so as to lock said spacer in said panel when said annular face of said other end is in said abutting engagement with said other skin sheet, an intermediate body portion with a thickened wall section adjoining said tubular end portion and having an internal thread defining a threaded socket to receive a fastener bolt, said tubular end portion of the spacer defining an opening through which said bolt may be inserted, and said annular shoulder, in its abutting engagement with its adjacent skin sheet, anchoring said spacer against being stripped through said larger opening in response to the pull of said bolt when tightened in said socket, a tubular lip at the other end extremity of said spacer projecting through said smaller aperture and having an end portion turned outwardly and clamping said other skin sheet against said radial shoulder, and a partition wall sealing the end of said threaded socket intermediate said socket and said lip.

References Cited

UNITED STATES PATENTS

| Re. 20,055 | 8/1936 | Huck | 85—70 X |
| 2,562,336 | 7/1951 | Selden | 85—70 |
| 2,967,593 | 1/1961 | Cushman | 52—617 |
| 3,197,854 | 8/1965 | Rohe et al. | 29—455 |

FRANK L. ABBOTT, *Primary Examiner.*

R. W. COOKE, Jr., A. C. PERHAM,
*Assistant Examiners.*